United States Patent
Yu et al.

(10) Patent No.: US 10,754,420 B2
(45) Date of Patent: Aug. 25, 2020

(54) METHOD AND DEVICE FOR DISPLAYING IMAGE BASED ON VIRTUAL REALITY (VR) APPARATUS

(71) Applicant: TENCENT TECHNOLOGY (SHENZHEN) COMPANY LIMITED, Shenzhen (CN)

(72) Inventors: Zhixiong Yu, Shenzhen (CN); Yao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 12 days.

(21) Appl. No.: 16/206,146

(22) Filed: Nov. 30, 2018

(65) Prior Publication Data
US 2019/0094956 A1     Mar. 28, 2019

Related U.S. Application Data

(63) Continuation of application No. PCT/CN2017/101908, filed on Sep. 15, 2017.

(30) Foreign Application Priority Data

Sep. 20, 2016 (CN) .......................... 2016 1 0836608

(51) Int. Cl.
*G06F 3/01*    (2006.01)
*G06T 15/20*   (2011.01)
(Continued)

(52) U.S. Cl.
CPC ............... *G06F 3/011* (2013.01); *G06F 3/01* (2013.01); *G06T 3/4038* (2013.01); *G06T 15/205* (2013.01); *H04N 21/42218* (2013.01)

(58) Field of Classification Search
CPC .......... G06F 3/011; G06F 3/01; G06T 3/4038; G06T 15/205; H04N 21/42218
See application file for complete search history.

(56) References Cited

U.S. PATENT DOCUMENTS

2011/0043627 A1*  2/2011  Werling .................. G06T 17/05
                                                             348/143
2011/0043644 A1   2/2011  Munger et al.
(Continued)

FOREIGN PATENT DOCUMENTS

CN     104021585 A     9/2014
CN     104168315 A    11/2014
(Continued)

OTHER PUBLICATIONS

The World Intellectual Property Organization (WIPO) International Search Report for PCT/CN2017/101908 dated Dec. 20, 2017 6 Pages (including translation).
(Continued)

*Primary Examiner* — Tapas Mazumder
(74) *Attorney, Agent, or Firm* — Anova Law Group, PLLC

(57) ABSTRACT

A method is provided for displaying an image based on a virtual reality (VR) apparatus. The method includes acquiring an image of raw-shooting-material and acquiring a shooting field-of-view (FOV) of the image of raw-shooting-material. The method also includes setting a scene FOV of a virtual scene of the VR apparatus according to the shooting FOV, and performing scene image generation and adaption to generate a scene image according to the image of raw-shooting-material and the scene FOV and to determine a size of the scene image according to the scene FOV. Further, the method includes determining a display area of the scene
(Continued)

image by using a gyroscope sensor, and displaying the display area on a display screen of the VR apparatus.

15 Claims, 9 Drawing Sheets

(51) Int. Cl.
  *H04N 21/422* (2011.01)
  *G06T 3/40* (2006.01)

(56) References Cited

U.S. PATENT DOCUMENTS

| | | |
|---|---|---|
| 2014/0009503 A1 | 1/2014 | Gorstan et al. |
| 2016/0241837 A1 | 8/2016 | Cole et al. |
| 2017/0150230 A1* | 5/2017 | Shimura ............ H04N 21/6156 |
| 2018/0365797 A1 | 12/2018 | Yu et al. |
| 2018/0367739 A1* | 12/2018 | Messely ............ H04N 5/23299 |

FOREIGN PATENT DOCUMENTS

| | | |
|---|---|---|
| CN | 104506841 A | 4/2015 |
| CN | 105869110 A | 8/2016 |
| CN | 105898138 A | 8/2016 |
| CN | 105913379 A | 8/2016 |
| GB | 2523740 A | 9/2015 |
| WO | 2012166593 A2 | 12/2012 |

OTHER PUBLICATIONS

The European Patent Office (EPO) The Extended European Search Report for 17852335.3 dated Jul. 15, 2019 8 Pages.

* cited by examiner

METHOD AND DEVICE FOR DISPLAYING IMAGE BASED ON VIRTUAL REALITY (VR) APPARATUS

RELATED APPLICATIONS

This application is a continuation application of PCT Patent Application No. PCT/CN2017/101908, filed on Sep. 15, 2017, which claims priority to Chinese Patent Application No. 201610836608.7 filed on Sep. 20, 2016, content of all of which is incorporated herein by reference in its entirety.

FIELD OF TECHNOLOGY

The present disclosure relates to the field of computer technologies and, particularly, to a method and device for displaying an image based on a VR apparatus, and a computer storage medium.

BACKGROUND

In a conventional VR technology, a head-mounted display (HMD) is an important hardware device. The HMD acquires an orientation of a head of a user in real time, and presents scenery in this direction to the user on a display screen. During this process, the size and position of the presented scenery greatly influences the immersion sense of a viewer. The size of the scenery viewed by the viewer in a virtual scene should be the same as the size in a real scene, and the position of the scenery in the virtual scene should keep unchanged when the viewer's head rotates.

According to a usual processing method, an image is randomly rendered to a spherical inner surface, the field of view (FOV) is put in the center of the sphere, and the image can be viewed at any FOV, where the FOV refers to the range that can be covered by a lens. As a result, a frame of image in a virtual scene viewed by a viewer is inconsistent with true feeling of the viewer. For example, the viewer will feel like viewing from an FOV of a giant or an ant, and when the viewer rotates the head, scenery in the line of sight will deviate with rotation of the viewer's head. Consequently, an image display method in the conventional VR technology has poor realism of visual effects.

The disclosed methods and systems are directed to solve one or more problems set forth above and other problems.

SUMMARY

In light of the above, in order to resolve a problem that an image display method in a conventional VR technology has poor realism of visual effects, a method and device for displaying an image based on a VR apparatus, and a computer storage medium are provided.

Accordingly, one aspect of the present disclosure includes a method for displaying an image based on a virtual reality (VR) apparatus. The method includes acquiring an image of raw-shooting-material and acquiring a shooting field-of-view (FOV) of the image of raw-shooting-material. The method also includes setting a scene FOV of a virtual scene of the VR apparatus according to the shooting FOV, and performing scene image generation and adaption to generate a scene image according to the image of raw-shooting-material and the scene FOV and to determine a size of the scene image according to the scene FOV. Further, the method includes determining a display area of the scene image by using a gyroscope sensor, and displaying the display area on a display screen of the VR apparatus.

Another aspect of the present disclosure includes a device for displaying an image based on a VR apparatus. The device includes a memory storing computer program instructions, and a processor coupled to the memory. When executing the computer program instructions, the processor is configured to perform: acquiring an image of raw-shooting-material and acquiring a shooting field-of-view (FOV) of the image of raw-shooting-material; setting a scene FOV of a virtual scene of the VR apparatus according to the shooting FOV; performing scene image generation and adaption to generate a scene image according to the image of raw-shooting-material and the scene FOV, and to determine a size of the scene image according to the scene FOV; and determining a display area of the scene image by using a gyroscope sensor, and displaying the display area on a display screen of the VR apparatus.

Another aspect of the present disclosure includes a non-transitory computer-readable storage medium. The non-transitory computer-readable storage medium stores computer program instructions executable by at least one processor to perform: acquiring an image of raw-shooting-material and acquiring a shooting field-of-view (FOV) of the image of raw-shooting-material; setting a scene FOV of a virtual scene of the VR apparatus according to the shooting FOV; performing scene image generation and adaption to generate a scene image according to the image of raw-shooting-material and the scene FOV, and to determine a size of the scene image according to the scene FOV; and determining a display area of the scene image by using a gyroscope sensor, and displaying the display area on a display screen of the VR apparatus.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings in the following description show only some but not all embodiments of the present disclosure, and a person of ordinary skill in the art may derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In order to resolve the problem that an image display method in a conventional VR technology has poor realism of visual effects, a method for displaying an image based on a VR apparatus is provided. Implementation of the method may rely on a computer program, the computer program may run in a computer system based on a von Neumann system and may run in a head-mounted display (HMD) of a VR apparatus or a computer host connected to an HMD.

Figure 1:
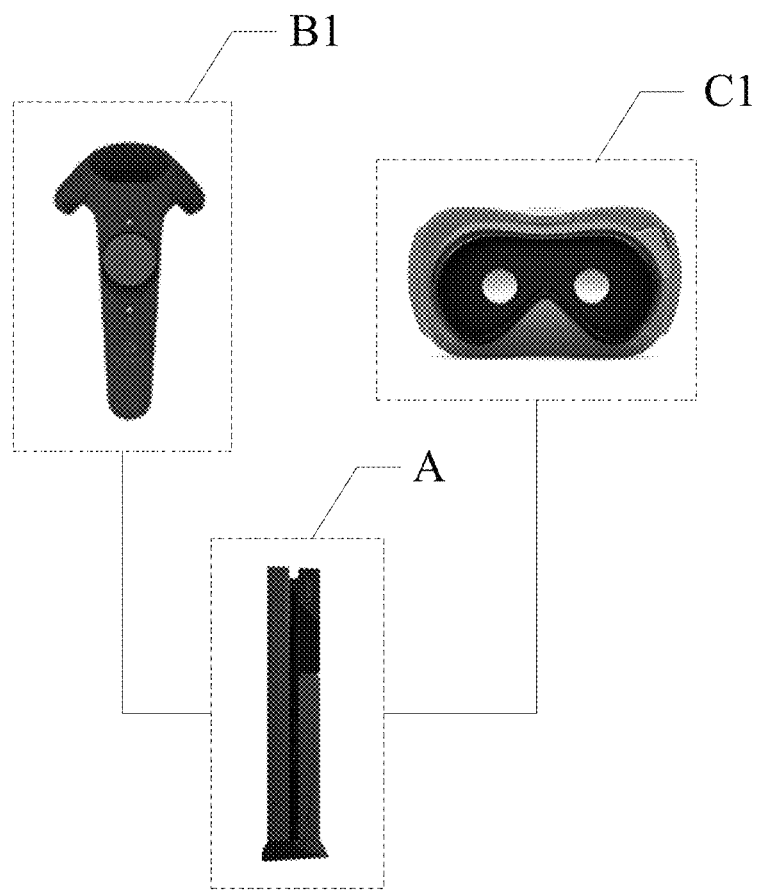
FIG. 1 is a schematic view of a VR apparatus according to an embodiment of the present disclosure.
Figure 2:
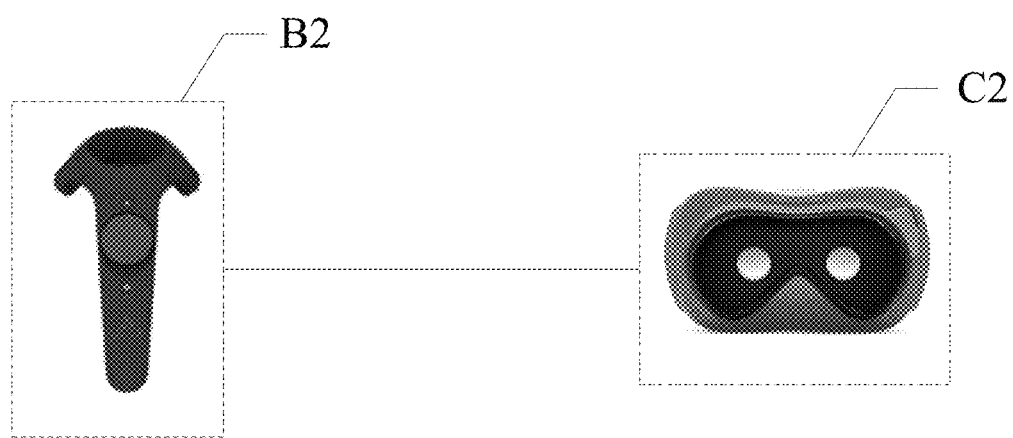
FIG. 2 is a schematic view of another VR apparatus according to an embodiment of the present disclosure.

As shown in FIG. 1, an HMD apparatus is connected to a computer host apparatus A in which a computer program may run, the computer host is based on a computer system of a von Neumann system, an HMD apparatus B1 serves as a display apparatus of the computer apparatus, and a luminance regulation method based on an HMD apparatus may run in the computer host. In another embodiment, as shown in FIG. 2, the computer host running the luminance regulation method based on the HMD apparatus may also be integrated into the HMD apparatus, and the luminance regulation method based on the HMD apparatus may run in the HMD apparatus.

Figure 3:
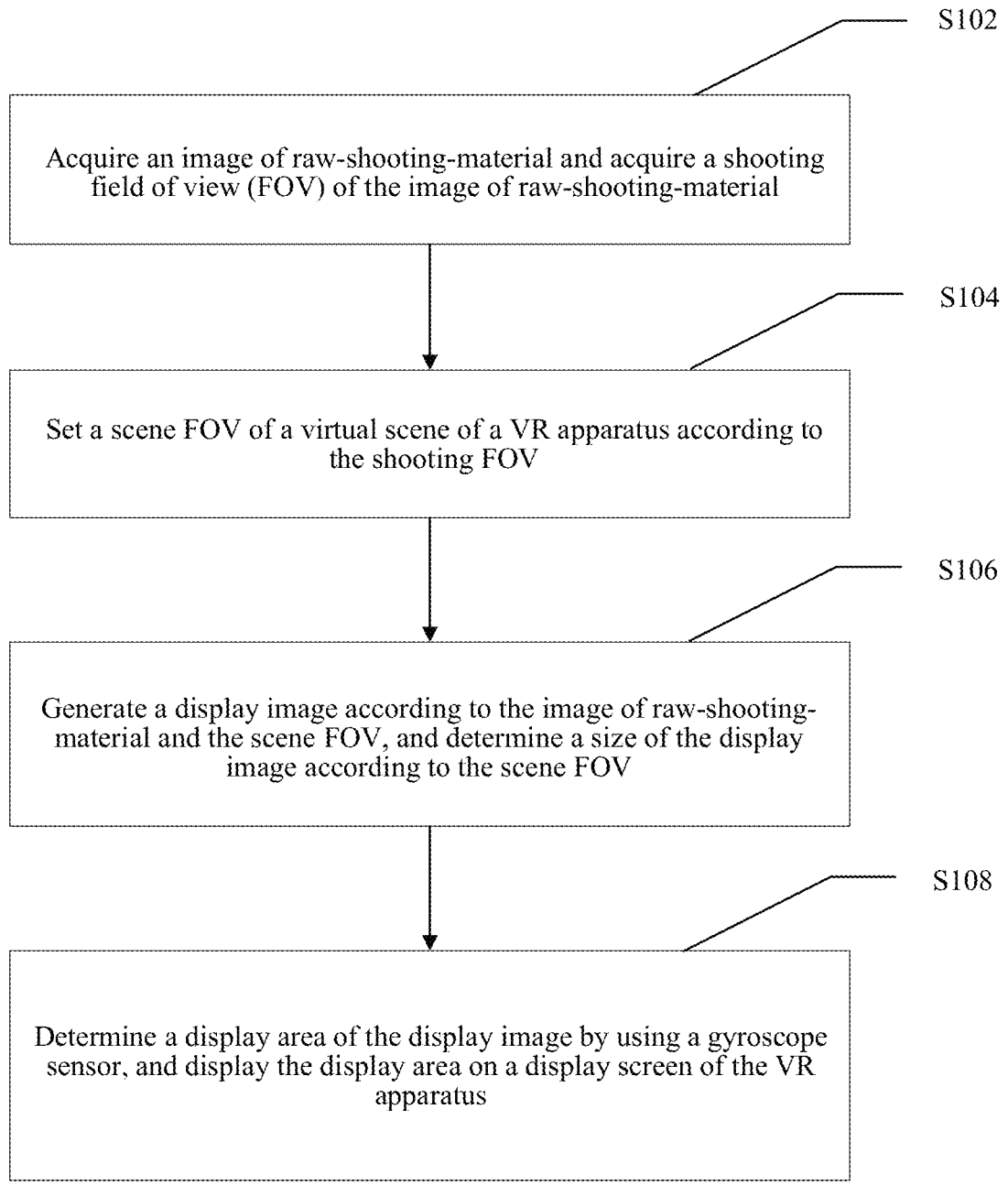
FIG. 3 is a flow chart of a method for displaying an image based on a VR apparatus according to an embodiment of the present disclosure.

Specifically, as shown in FIG. 3, the method for displaying an image based on a VR apparatus includes the followings.

Step S102: Acquiring one or more image of raw-shooting-material and a shooting FOV of the image of the raw-shooting-material. The raw-shooting-material may refer to the raw, original, or unprocessed data from a photo or video shot, i.e., the unprocessed data generated when shooting a photo or a video.

In a VR technology, a user needs to wear an HMD apparatus. The HMD apparatus is usually a helmet, spectacles, or an eyepatch. A display screen is disposed in the HMD, and located in front of the eyes of the user after the user wears the HMD apparatus. The VR technology is to process the images of the raw-shooting-material of a real scene to be presented on the display screen of the HMD, so that the visual field of the user is fully covered by the image displayed on the display screen, and the user can immerse in a virtual scene.

For example, in a VR application of a museum scene, a virtual museum interior scene needs to be constructed for a VR user. Therefore, images shot inside the museum are needed and used as raw-shooting-material. A panoramic camera may be used to take pictures of the target museum in advance, so as to obtain panoramic or wide-range images as raw-shooting-material, or an ordinary camera can also be used to take panoramic pictures in a time-lapse shooting mode, so as to obtain panoramic or wide-range images as raw-shooting-material. When files of the raw-shooting-material are saved, not only the images of the raw-shooting-material need to be saved, but also shooting FOVs of the panoramic camera need to be recoded. For example, the shooting FOV of the images may be obtained according to the FOVs of the lens of the panoramic camera or with reference to the rotation angles of the panoramic camera during photo-shooting. The images acquired may be either panoramic images with a shooting FOV being 360 degrees or wide-range images with a shooting FOV less than 360 degrees.

Step S104: Setting a scene FOV of a virtual scene of the VR apparatus according to the shooting FOV.

The scene FOV of the virtual scene of the VR apparatus is a viewable angle of the virtual scene presented by the VR apparatus to a user. For example, referring to FIG. 4, the scene FOV is an FOV of the virtual scene constructed by the VR apparatus according to the scene image, the display screen may display only a part of an image area, the visual angle of the naked eyes of a user is the viewable angle of the display screen, and the scene FOV may be wider. When the user turns head and rotates the helmet of the VR apparatus to adjust the position of the display screen of the VR apparatus, a view-finding position of the display screen on the scene image is moved to present a display area of a new position. In other words, the scene FOV is an observable angle of a virtual scene constructed by using all images that can be observed by a user through turning head or looking up.

For example, in the foregoing example, the panoramic camera in the museum is arranged at the entrance of an exhibition hall to take pictures of the entrance of the exhibition hall to construct a virtual scene of "the user is at the entrance of the exhibition hall". The shooting FOV of the panoramic camera may be set to 180 degrees (because only a virtual scene of looking at the interior of the exhibition hall from the entrance needs to be provided for the user, images of scenery outside the exhibition hall do not need to be taken), and the visual field of the naked eyes of a user may be only 120 degrees. Therefore, the user needs to turn head right or left to feel the virtual scene at the exhibition hall.

Step S106: Generating a scene image according to the image of raw-shooting-material and the scene FOV, and determine a size of the scene image according to the scene FOV.

When the VR apparatus generates the scene image, the image of raw-shooting-materials cannot be used directly, but need to be processed first and to be set the scene image adapting to the VR apparatus, so that the VR scene becomes more realistic. During the adaption process, adaption in two aspects needs to be performed.

On one hand, one or more image of raw-shooting-material needs to be rendered, so that it seems that there is a true distance. Specifically, the image of raw-shooting-material is rendered to an arc inner surface of the virtual scene of the VR apparatus to generate the scene image, and the radian of the arc inner surface of the virtual scene of the VR apparatus is the radian corresponding to the scene FOV.

Figure 5:
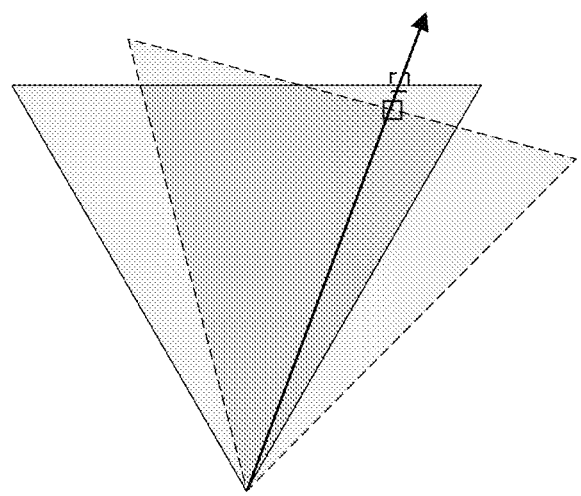
FIG. 5 is a schematic view of a depth change of a scene image experiencing no arc rendering when a user rotates according to an embodiment of the present disclosure.
Figure 6:
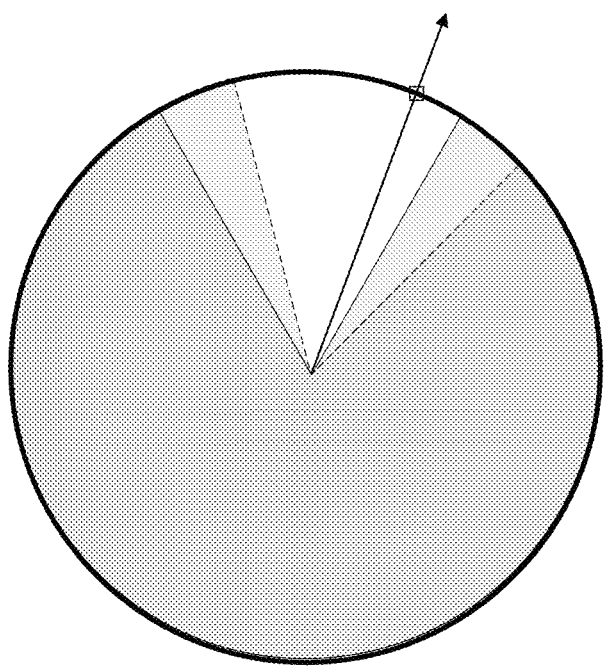
FIG. 6 is a schematic view of a depth change of a scene image experiencing arc rendering when a user rotates according to another embodiment of the present disclosure.

Referring to FIG. 5 and FIG. 6 at the same time, if the image of raw-shooting-material is directly displayed without being rendered, as shown in FIG. 5, when the user rotates the helmet, pixel points of the picture in a same direction exhibit visual sense of being close to or far away from the user, so that the user may feel the distance of the image changing with the rotation of the helmet, and then feel unrealistic.

If the image of raw-shooting-material is rendered according to the radian corresponding to the scene FOV, as shown in FIG. 6, no matter how the user rotates the helmet, the visual depth of the pixel points in the same direction is unchanged, and the distance of the image is unchanged, so that the scene presented by the VR is more realistic and the realism of imaging of the VR apparatus is enhanced.

On the other hand, the size of the scene image needs to be determined. In one embodiment, the generating a scene image according to the image of raw-shooting-material and the scene FOV, and determining a size of the scene image according to the scene FOV further includes: acquiring a preset size of the panoramic image rendered by a display screen of the VR apparatus; calculating a ratio of the degree of the scene FOV to 360 degrees, and determining the size of the scene image according to the ratio and the size of the panoramic image rendered by the display screen.

For example, if the preset size of a panoramic scene image when the VR apparatus displays the panoramic image is 4096×2160 pixels, in other words, the VR apparatus needs to adjust the size of panoramic (that is, the angle of the shooting FOV is 360 degrees) image of raw-shooting-material to be 4096×2160 pixels, and if the scene FOV of the image of raw-shooting-material is 180 degrees (only the angle in the horizontal direction is considered herein, and the angle in the vertical angle can be deduced in a similar way), the size of the scene image corresponding to the image of raw-shooting-material may be set to 2048×2160 pixels (assuming that the vertical direction still has a panoramic FOV). The size of the scene image obtained after adjustment adapts to the VR apparatus.

Figure 7:
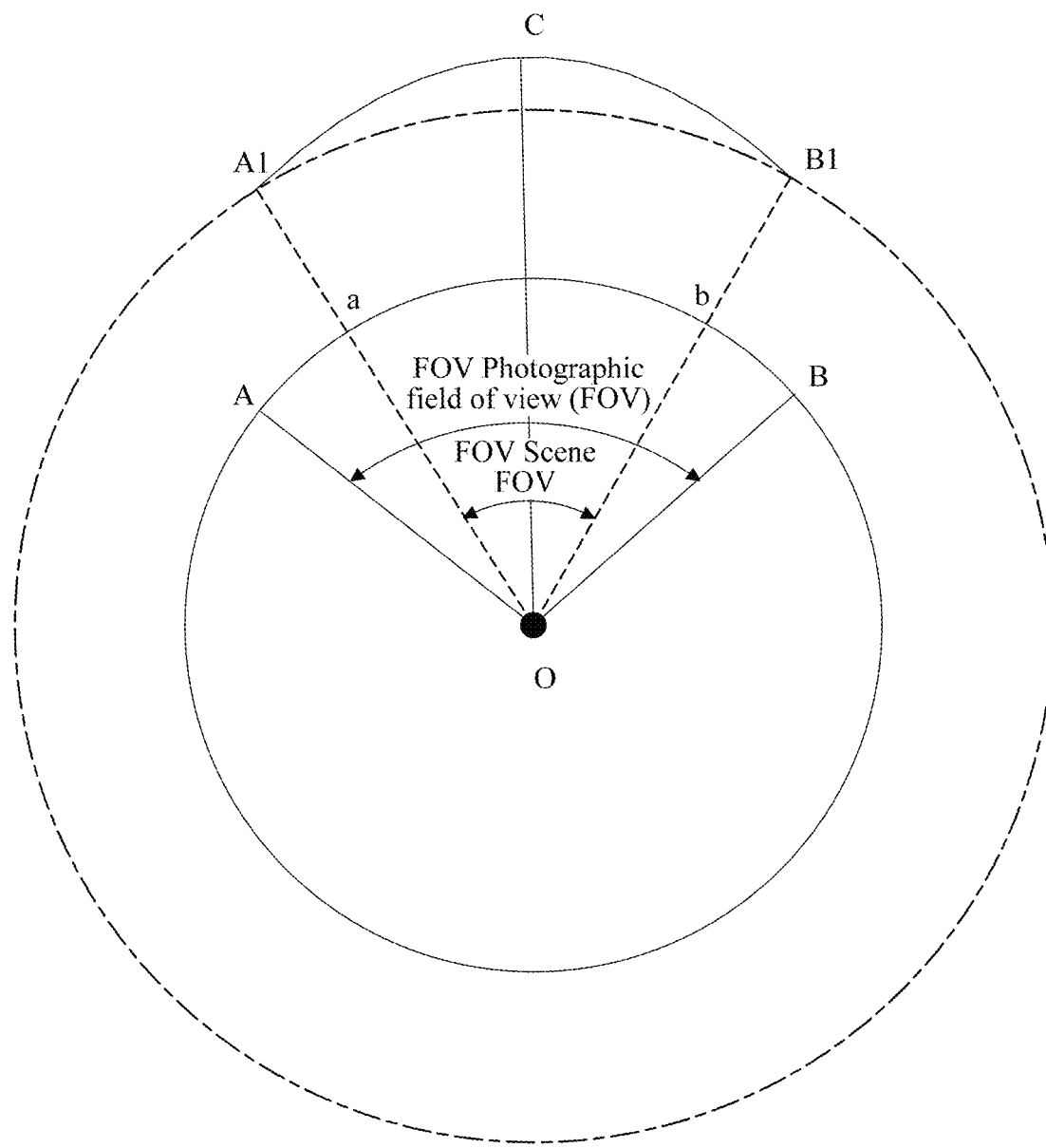
FIG. 7 is a principle diagram of image distortion caused when a scene FOV is not set according to a photographic FOV according to an embodiment of the present disclosure.

Referring to FIG. 7, if the scene FOV is not equal to the shooting FOV, it is assumed that the shooting FOV is greater than the scene FOV (vice versa), the scene contained in the shooting FOV is compressed into the scene FOV. In other words, the arc AB is compressed to ab for display. In this case, the image is reduced. In other words, it is equivalent to that the arc AB is moved to A1B1. Furthermore, because a head rotation angle is actually determined according to the scene FOV, when the head of the user points to point B1 from point A1, content in the scene viewed by the user moves from point A to point B. As a result, during rotation, depths of the scenery in the center of the visual field and the scenery at the edge are changed, that is, C, A1, and B1 are not in a same arc.

After the scene FOV is set according to the shooting FOV, and the size of the scene image is set according to the scene FOV and the preset size corresponding to the panoramic scene image, the arc AB has the same radian as that of the arc ab, point A1 and point A are located in a same direction, and point B1 and point B are located in a same direction, so that during rotation, the depths of the scenery in the center of the visual field and the scenery at the edge do not change, that is, C, A1, and B1 are still on the same arc. Thus, even though a user rotates the helmet, the depth of the image in the VR virtual scene does not change accordingly, so that the VR scene is more realistic and the realism of the imaging of the VR apparatus is enhanced.

Step S108: Determining a display area of the scene image by using a gyroscope sensor, and displaying the display area on a display screen of the VR apparatus.

Figure 4:
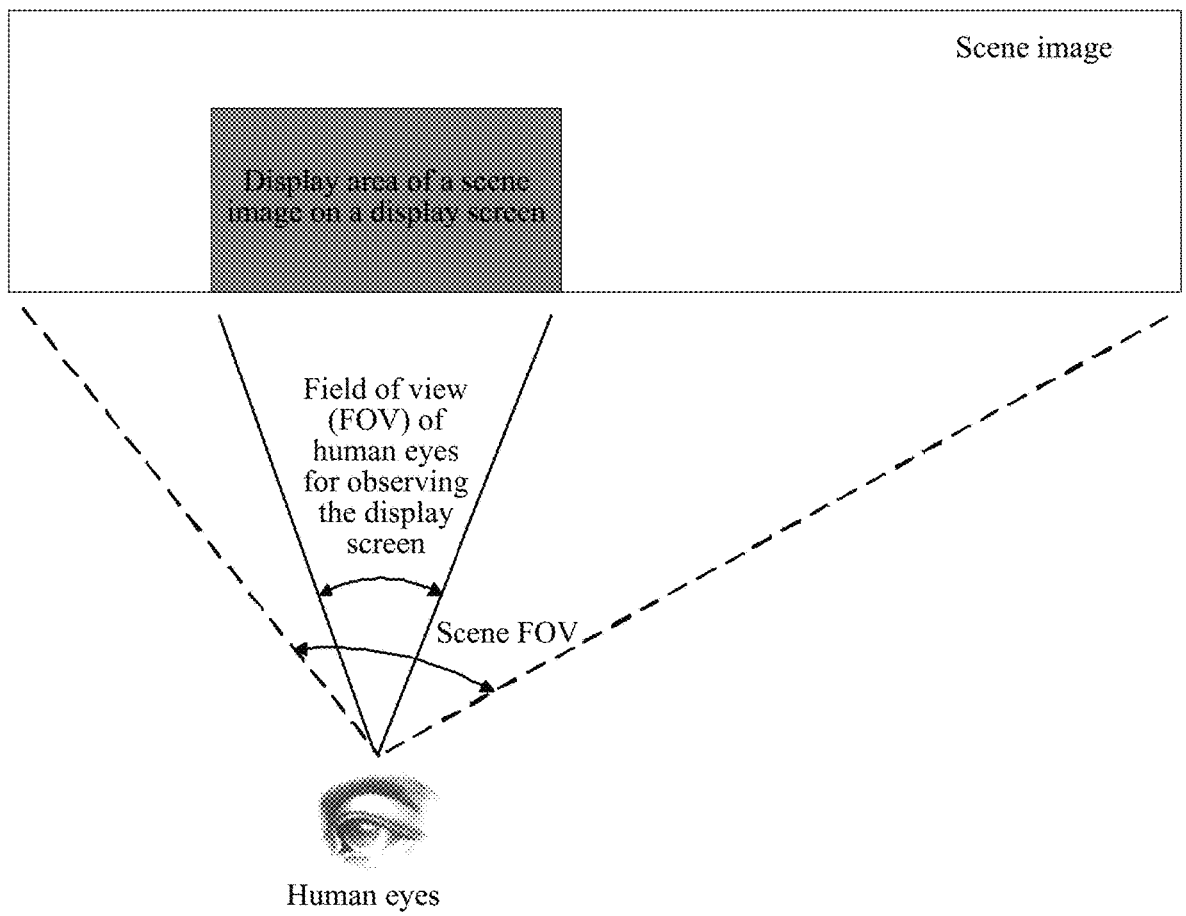
FIG. 4 is a schematic view of a scene FOV of imaging of a VR apparatus according to an embodiment of the present disclosure.

The gyroscope sensor on the VR apparatus can detect a rotation angle of the VR apparatus. The gyroscope sensor is usually a three-axis gyroscope and, therefore, can detect rotation angles in horizontal and vertical directions. Referring to FIG. 4, the gyroscope sensor can detect an angle between an orientation direction of the user and a preset reference direction (a reference direction initially set during power-on or when an application is started), and then a display area is selected on the scene image according to a ratio between the angle and the scene FOV, and is finally displayed on the display screen of the VR apparatus.

In one embodiment, after the VR apparatus displays the scene image, a rotation angle of the VR apparatus may further be detected by using the gyroscope sensor; a ratio between the rotation angle and the scene FOV is calculated, and the display area on the scene image is moved according to the size of the scene image and the ratio.

For example, if the rotation angle is 30 degrees, the scene FOV is 120 degrees, the coordinate value of the initial display area is 234 pixel position, and a length of the scene image in the rotation direction is 2096, 30-degree rotation may cause movement by the 524 pixel position, and therefore, the coordinate value of the new display area is 758 pixel position.

Similarly, if a rotation angular velocity is 10 degrees per second, the scene FOV is 160 degrees, and a length of the scene image in a rotation direction is 2096, a moving speed of the coordinate value of the display area is 2096×10/160=131 pixels per second.

In one embodiment, in order to further enhance the realism of imaging of the VR apparatus, a size of the display area further needs to be set. Specifically, a lens FOV of the VR apparatus is acquired, and an observable FOV of the display screen of the VR apparatus is set according to the lens FOV of the VR apparatus; and the size of the display area is determined according to the observable FOV, the scene FOV, and the size of the scene image.

Referring to FIG. 4, the observable FOV of the display screen of the VR apparatus is an FOV of human eyes for observing the display screen in FIG. 4. However, in the VR apparatus, in order to achieve better visual experience, a lens is usually arranged between human eyes and a display screen, so that human eyes can see an enlarged virtual image. In this case, a larger display screen does not need to be arranged to cover the visual field of human eyes. A smaller display screen is arranged, and the visual field of human eyes can be covered through an optical enlargement function of the lens.

Figure 8:
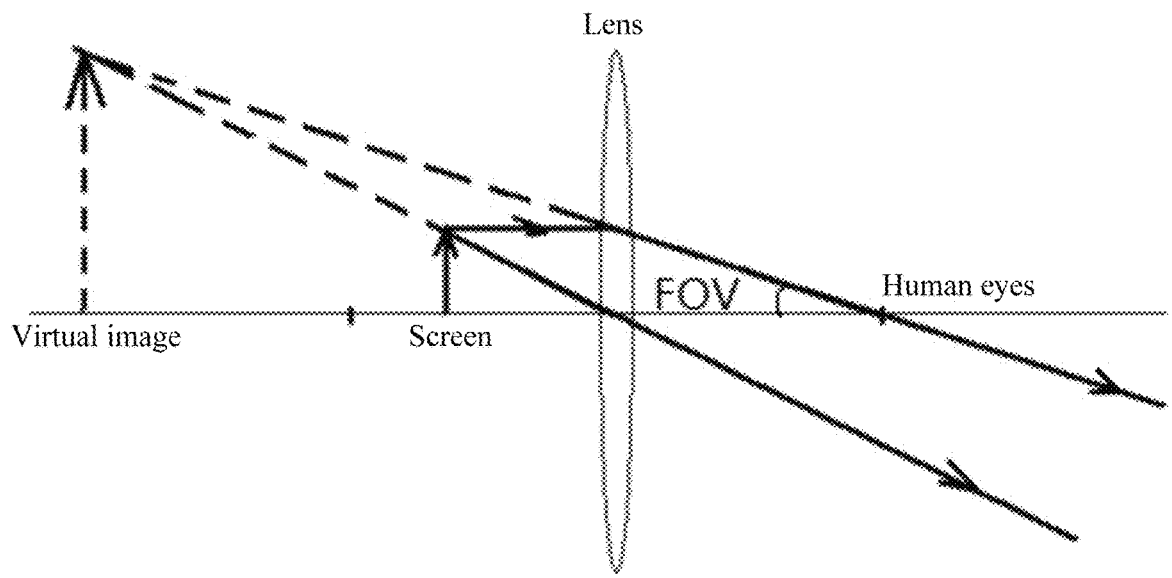
FIG. 8 is an optical path diagram of a process of imaging on a display screen of a VR apparatus through a lens according to an embodiment of the present disclosure.
Figure 9:
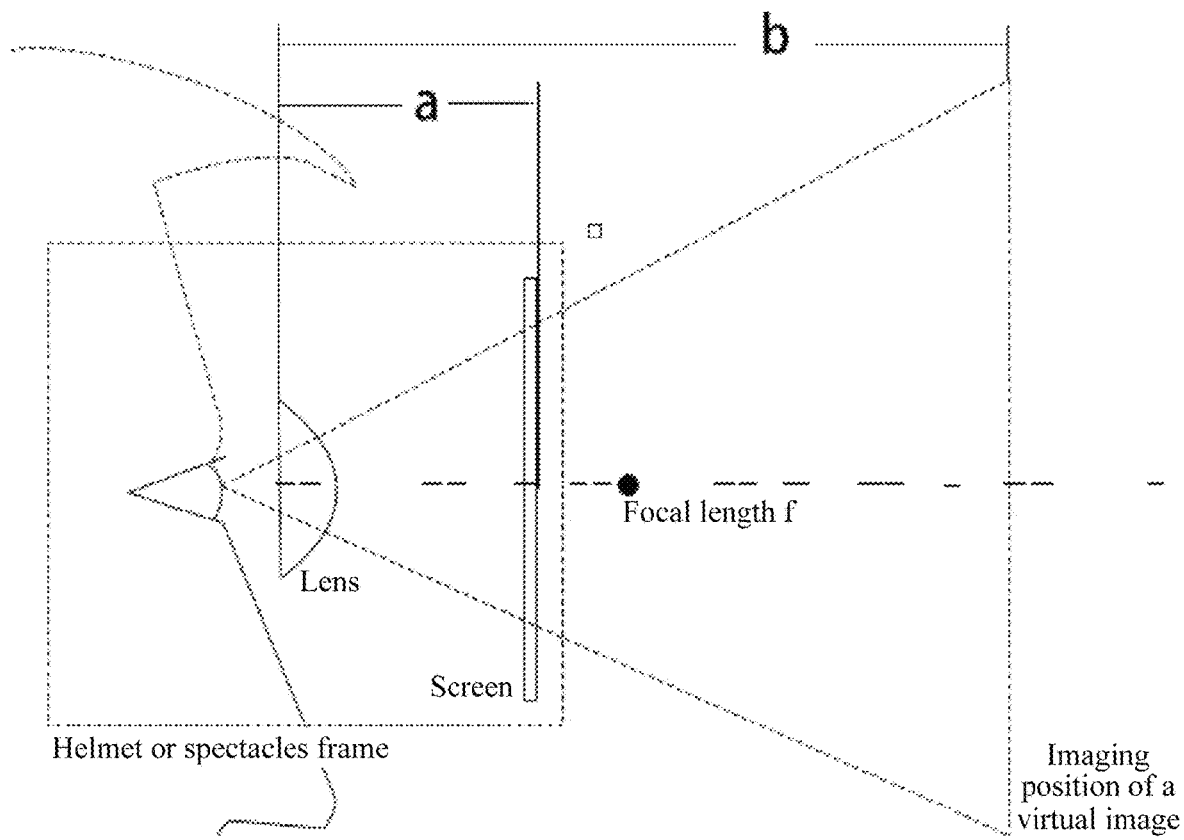
FIG. 9 is an optical path diagram of a process of imaging on a display screen of a VR apparatus through a lens according to another embodiment of the present disclosure.

Referring to FIG. 8 and FIG. 9, FIG. 8 and FIG. 9 show an optical path diagram of imaging among human eyes, a lens, and a display screen. As can be learned according to the imaging formula of the lens:

$$\frac{1}{f} = \frac{1}{u} + \frac{1}{v},$$

where f represents a focal length, u represents an object distance, and v represents an image distance the visual angle of the display screen cannot be determined simply by calculating a distance between human eyes and the display screen and the size of the display screen, so as to determine the size of the display area. Conversion needs to be performed according to the imaging formula of the lens, and a lens FOV is obtained through conversion. In other words, the lens FOV is obtained according to the size of a virtual image and a distance between human eyes and the virtual image. Then, the lens FOV serves as the observable angle of the display screen, so as to determine the size of the display area. For example, in FIG. 8 and FIG. 9, the display area of the scene image presented on the display screen by the VR apparatus having the lens should be smaller than the display area obtained when no lens is added.

Figure 10:
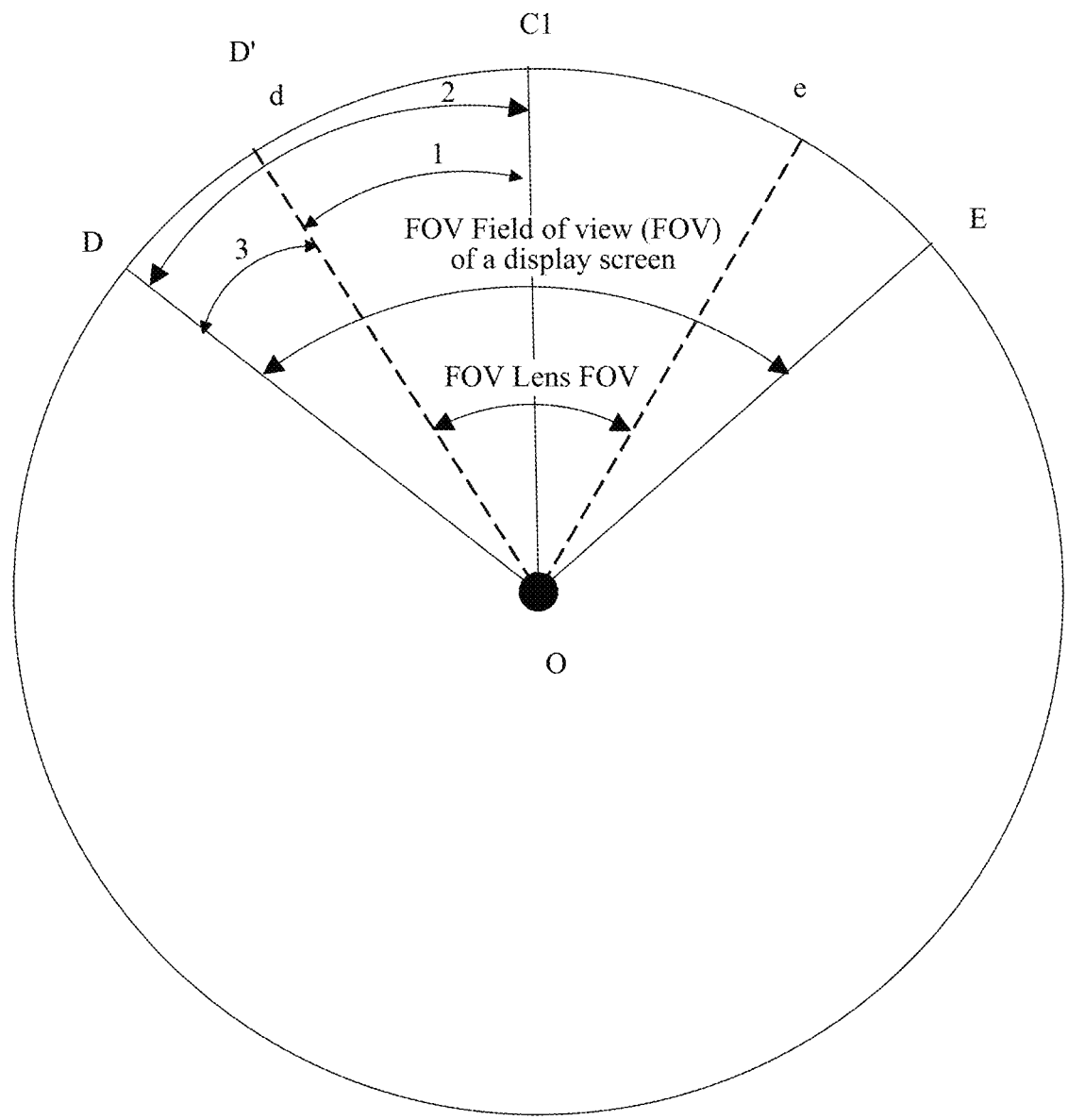
FIG. 10 is a principle diagram of image distortion caused when an observable FOV of a display screen is not set with reference to a lens FOV according to an embodiment of the present disclosure.

If the observable FOV of the display screen is set not according to the lens FOV, but according to the size of the display screen and the distance between human eyes and the display screen, referring to FIG. 10, it is assumed that the lens FOV is less than the FOV (vice versa), the angle observed by the user through the lens is less than the angle of the displayed content, that is, the content between the included angle DE is observed through the included angle de. In other words, content D' in a direction D in the virtual scene may be displayed in a direction d. Because head rotation of the user is corresponding to FOV rotation in the virtual scene, when a user desires to see D' displayed in the direction d, the user may feel that D' can be viewed after rotation by an angle 1, but actually, the user can see D' only when rotating the head by an angle 2. Therefore, when observing D' by rotating from C1, D' may deviate to rotate from d to D. In this way, the user may have an unrealistic feeling of "the head rotates by an angle, but the object in the virtual scene rotates by a different angle", and as a result, the realism is reduced.

However, after the observable FOV of the display screen is set according to the lens FOV, D and D' are at the same position, and when a user rotates by a particular angle, the object in the virtual scene also rotates by the same degree, so as to enhance the realism of imaging of the VR apparatus.

In addition, it should be noted that, in some VR apparatuses, the position between the lens and the display screen may be adjusted, as well as the distance between the lens and human eyes and the distance between human eyes and the display screen. In such an application scene, a corresponding sensor device may be arranged on the VR apparatus to detect the distance adjusted by the user. Then, the lens FOV is re-set according to the distances adjusted by the user and between the human eyes, the lens, and the display and the focal length of the lens, so that even after the user adjusts the distances, the realism of imaging of the VR apparatus still can be ensured.

Figure 11:
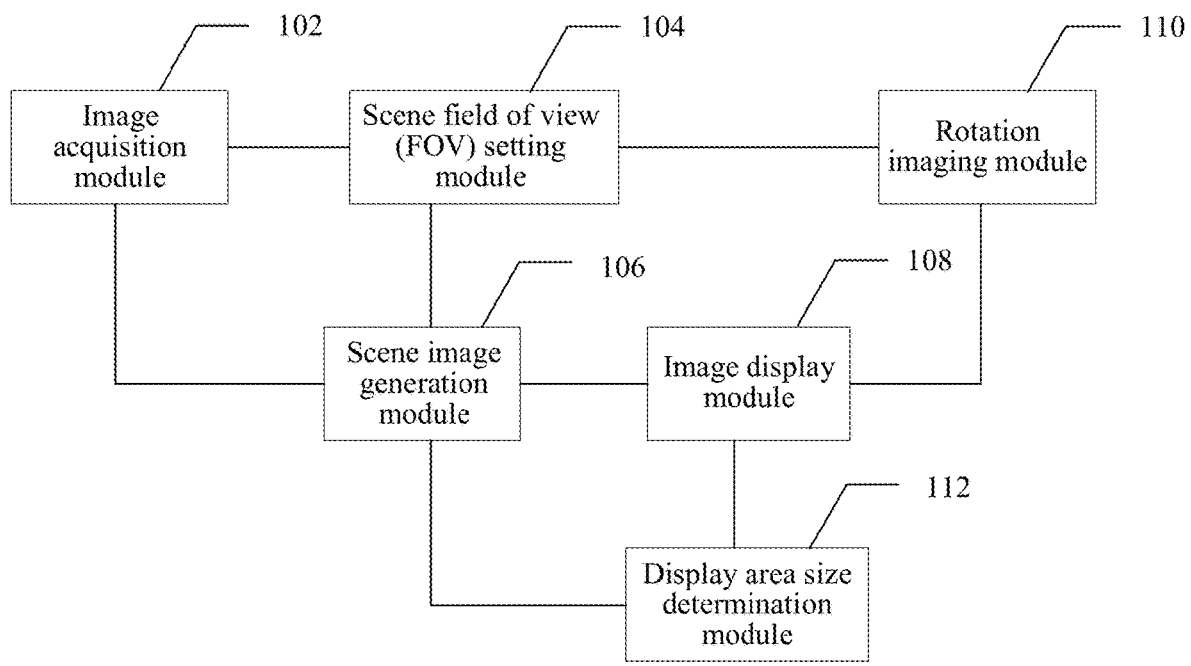
FIG. 11 is a schematic diagram of a device for displaying an image based on a VR apparatus according to an embodiment of the present disclosure.

In addition, in order to solve the problem that realism of visual effects is poor due to the image display method in the conventional VR technology, in an embodiment, as shown in FIG. 11, a device for displaying an image based on a VR apparatus is provided and includes an image acquisition module 102, a scene FOV setting module 104, a scene image generation module 106, and an image display module 108.

The image acquisition module 102 is configured to acquire at least one image of raw-shooting-material and acquire a shooting FOV of the image of raw-shooting-material.

The scene FOV setting module 104 is configured to set a scene FOV of a virtual scene of the VR apparatus according to the shooting FOV.

The scene image generation module 106 is configured to generate a scene image according to the image of raw-shooting-material and the scene FOV, determine a size of the scene image according to the scene FOV.

The image display module 108 is configured to determine a display area of the scene image by using a gyroscope sensor, and display the display area on a display screen of the VR apparatus.

In one embodiment, the image display module 108 is configured to render the image of raw-shooting-material on an arc inner surface of the virtual scene of the VR apparatus to generate the scene image. A radian of the arc inner surface of the virtual scene of the VR apparatus is a radian corresponding to the scene FOV.

In one embodiment, the image display module 108 is further configured to acquire a preset size of a panoramic image rendered by the display screen of the VR apparatus; to calculate a ratio of a degree of the scene FOV to 360 degrees, and to determine the size of the scene image according to the ratio and the size of the display screen rendering panoramic image.

In one embodiment, as shown in FIG. 11, the apparatus further includes a rotation imaging module 110, configured to detect a rotation angle of the VR apparatus by using the gyroscope sensor; calculate a ratio between the rotation angle and the scene FOV, and move the display area on the scene image according to the size of the scene image and the ratio.

In one embodiment, as shown in FIG. 11, the apparatus further includes a display area size determining module 112, configured to acquire a lens FOV of the VR apparatus; set an observable FOV of the display screen of the VR apparatus according to the lens FOV of the VR apparatus; and determine a size of the display area according to the observable FOV, the scene FOV, and the size of the scene image.

Implementation of the embodiments of the present disclosure brings about the following beneficial effects.

After the method and device for displaying an image based on the VR apparatus are used, a scene FOV of a scene image and a shooting FOV of an image of raw-shooting-material are set to be the same, so that when a user rotates a display screen of the VR apparatus, an image depth on the scene image does not change with the rotation performed by the user, and the display effects of the VR apparatus become more realistic, thereby enhancing the realism of the imaging of the VR apparatus.

Figure 12:
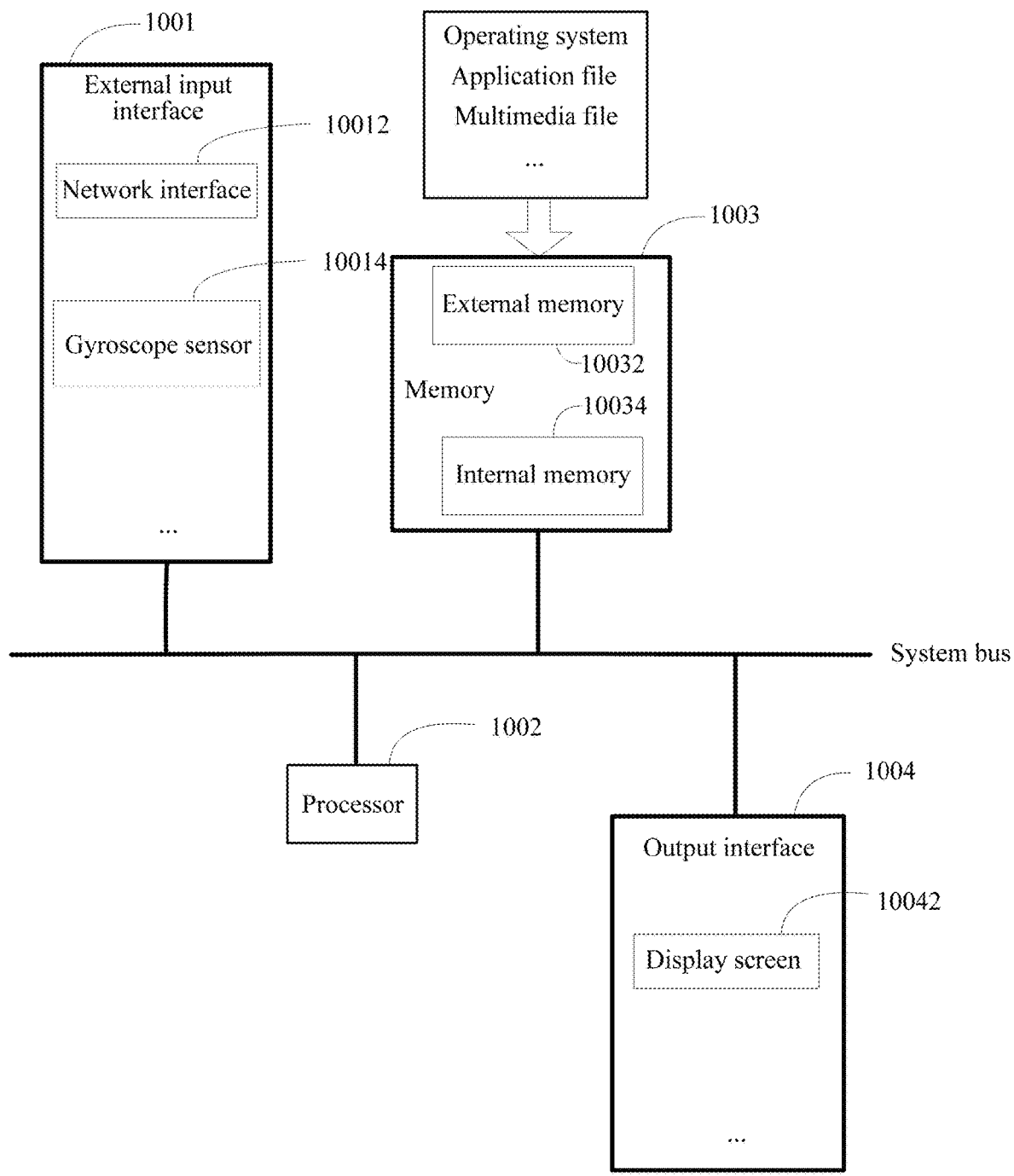
FIG. 12 is a schematic structural diagram of a computer apparatus according to an embodiment of the present disclosure.

In an embodiment, as shown in FIG. 12, FIG. 12 shows a VR apparatus 10 in a computer system that is based on a von Neumann system and that runs the method for displaying an image based on a VR apparatus. The computer system may be a host device of the VR apparatus or a VR HMD apparatus integrated with functions of a host device. Specifically, the computer system may include an external input interface 1001, a processor 1002, a memory 1003, and an output interface 1004 that are connected by using a system bus. The external input interface 1001 optionally may include at least a network interface 10012 and a gyroscope sensor 10014. The memory 1003 may include an external memory 10032 (for example, a hard disk, an optical disk, or a floppy disk) and an internal memory 10034. The output interface 1004 may include at least a display screen 10042.

In one embodiment, the method is performed based on a computer program. A program file of the computer program is stored in the external memory 10032 of the computer system 10 based on the von Neumann system, is loaded into the internal memory 10034 during execution, and then, is compiled into machine code, and the machine code is transmitted to the processor 1002 for execution, so as to form the image acquisition module 102, the scene FOV setting module 104, the scene image generation module 106, and the image display module 108 logically in the computer system 10 based on the von Neumann system. Furthermore, during a process of performing the method for displaying an image based on a VR apparatus, entered parameters are all received through the external input interface 1001, are transmitted to the memory 1003 for buffering, and then, are input into the processor 1002 for processing. Processed result data is buffered in the memory 1003 for subsequent processing or transmitted to the output interface 1004 for outputting.

A computer storage medium according to an embodiment of the present disclosure may be a memory including a computer program. The computer program may be executed by a processor in a data processing device, to perform the steps of the method in the foregoing embodiment. The computer storage medium may be an FRAM, a ROM, a PROM, an EPROM, an EEPROM, a Flash Memory, a magnetic surface memory, an optical disc, or a CD-ROM, or may be various devices including one or any combination of the memories, for example, a mobile phone, a computer, a tablet device, and a personal digital assistant.

The computer readable storage medium stores a computer program. When the processor executes the computer program, the processor performs the following steps of the method for displaying an image based on a VR apparatus.

In an embodiment, when the processor executes the computer program, the processor performs the following steps: acquiring an image of raw-shooting-material and acquiring a shooting FOV of the image of raw-shooting-material; setting a scene FOV of a virtual scene of the VR apparatus according to the shooting FOV; generating, during scene image generation and adaption, a scene image according to the image of raw-shooting-material and the scene FOV, and determining a size of the scene image according to the scene FOV; and determining a display area of the scene image by using a gyroscope sensor, and displaying the display area on a display screen of the VR apparatus.

In an embodiment, when the processor executes the computer program, the processor performs the following steps: rendering the image of raw-shooting-material to an arc inner surface of a virtual scene of the VR apparatus to generate the scene image, where a radian of the arc inner surface is a radian corresponding to the scene FOV.

In an embodiment, when the processor executes the computer program, the processor performs the following steps: acquiring a size of a display screen rendering panoramic image of the VR apparatus; and calculating a ratio of a degree of the scene FOV to 360 degrees, and determining the size of the scene image according to the ratio and the size of the panoramic image rendered by the display screen.

In an embodiment, when the processor executes the computer program, the processor performs the following steps: detecting a rotation angle of the VR apparatus by using the gyroscope sensor; and calculating a ratio between the rotation angle and the scene FOV, and moving the display area on the scene image according to the size of the scene image and the ratio.

In an embodiment, when the processor executes the computer program, the processor performs the following steps: acquiring a lens FOV of the VR apparatus; setting an observable FOV of the display screen of the VR apparatus according to the lens FOV of the VR apparatus; and determining a size of the display area according to the observable FOV, the scene FOV, and the size of the scene image.

The foregoing descriptions are merely preferred embodiments of the present disclosure, but are not intended to limit the scope of the present disclosure. Any equivalent change made according to the claims of the present disclosure shall fall within the protection scope of the present disclosure.

INDUSTRIAL APPLICABILITY

By using the embodiments of the present disclosure, a scene FOV of a scene image and a shooting FOV of an image of raw-shooting-material are set to be the same, so that when a user rotates a display screen of a VR apparatus, an image depth on the scene image does not change with the rotation performed by the user, and the display effects of the VR apparatus become more realistic, thereby enhancing the realism of the imaging of the VR apparatus

What is claimed is:

1. A method for displaying an image based on a virtual reality (VR) apparatus, comprising:
   acquiring an image of raw-shooting-material and acquiring a shooting field-of-view (FOV) of the image of raw-shooting-material;
   setting a scene FOV of a virtual scene of the VR apparatus according to the shooting FOV;
   generating a scene image according to the image of raw-shooting-material and the scene FOV, and determining a size of the scene image according to the scene FOV;
   determining a size of a display area of the scene image, including:
      acquiring a lens FOV of the VR apparatus;
      setting an observable FOV of a display screen of the VR apparatus according to the lens FOV of the VR apparatus; and
      determining the size of the display area according to the observable FOV, the scene FOV, and the size of the scene image; and
   determining the display area of the scene image by using a gyroscope sensor, and displaying the display area on a display screen of the VR apparatus.

2. The method according to claim 1, wherein the generating a scene image according to the image of raw-shooting-material and the scene FOV comprises:
   rendering the image of raw-shooting-material to an arc inner surface of a virtual scene of the VR apparatus to generate the scene image, a radian of the arc inner surface being a radian corresponding to the scene FOV.

3. The method according to claim 1, wherein the generating a scene image according to the image of raw-shooting-material and the scene FOV comprises:
   acquiring a size of a panoramic image rendered by the display screen of the VR apparatus; and
   calculating a ratio of a degree of the scene FOV to 360 degrees, and determining the size of the scene image according to the ratio and the size of the panoramic image rendered by the display screen.

4. The method according to claim 1, wherein, after displaying the scene image, the method further comprises:
   detecting a rotation angle of the VR apparatus by using the gyroscope sensor; and
   calculating a ratio between the rotation angle and the scene FOV, and moving the display area on the scene image according to the size of the scene image and the ratio.

5. The method according to claim 1, further comprising:
   adjusting a distance between the lens and the display screen; and
   modifying the lens FOV according to the distance as adjusted.

6. A device for displaying an image based on a virtual reality (VR) apparatus, comprising: a memory storing computer program instructions; and a processor coupled to the memory and, when executing the computer program instructions, configured to perform:
- acquiring an image of raw-shooting-material and acquiring a shooting field-of-view (FOV) of the image of raw-shooting-material;
- setting a scene FOV of a virtual scene of the VR apparatus according to the shooting FOV;
- generating a scene image according to the image of raw-shooting-material and the scene FOV, and determining a size of the scene image according to the scene FOV;
- determining a size of a display area of the scene image, including:
  - acquiring a lens FOV of the VR apparatus;
  - setting an observable FOV of a display screen of the VR apparatus according to the lens FOV of the VR apparatus; and
  - determining the size of the display area according to the observable FOV, the scene FOV, and the size of the scene image; and
- determining a display area of the scene image by using a gyroscope sensor, and displaying the display area on a display screen of the VR apparatus.

7. The device according to claim 6, wherein the generating a scene image according to the image of raw-shooting-material and the scene FOV comprises:
- rendering the image of raw-shooting-material to an arc inner surface of a virtual scene of the VR apparatus to generate the scene image, a radian of the arc inner surface being a radian corresponding to the scene FOV.

8. The device according to claim 6, wherein the generating a scene image according to the image of raw-shooting-material and the scene FOV comprises:
- acquiring a size of a panoramic image rendered by the display screen of the VR apparatus; and
- calculating a ratio of a degree of the scene FOV to 360 degrees, and determining the size of the scene image according to the ratio and the size of the panoramic image rendered by the display screen.

9. The device according to claim 6, wherein, after displaying the scene image, the processor is further configured to perform:
- detecting a rotation angle of the VR apparatus by using the gyroscope sensor; and
- calculating a ratio between the rotation angle and the scene FOV, and moving the display area on the scene image according to the size of the scene image and the ratio.

10. The device according to claim 6, wherein the processor is further configured to perform:
- adjusting a distance between the lens and the display screen; and
- modifying the lens FOV according to the distance as adjusted.

11. A non-transitory computer-readable storage medium storing computer program instructions executable by at least one processor to perform:
- acquiring an image of raw-shooting-material and acquiring a shooting field-of-view (FOV) of the image of raw-shooting-material;
- setting a scene FOV of a virtual scene of the VR apparatus according to the shooting FOV;
- generating a scene image according to the image of raw-shooting-material and the scene FOV, and determining a size of the scene image according to the scene FOV;
- determining a size of a display area of the scene image, including:
  - acquiring a lens FOV of the VR apparatus;
  - setting an observable FOV of a display screen of the VR apparatus according to the lens FOV of the VR apparatus; and
  - determining the size of the display area according to the observable FOV, the scene FOV, and the size of the scene image; and
- determining a display area of the scene image by using a gyroscope sensor, and displaying the display area on a display screen of the VR apparatus.

12. The non-transitory computer-readable storage medium according to claim 11, wherein the generating a scene image according to the image of raw-shooting-material and the scene FOV comprises:
- rendering the image of raw-shooting-material to an arc inner surface of a virtual scene of the VR apparatus to generate the scene image, a radian of the arc inner surface being a radian corresponding to the scene FOV.

13. The non-transitory computer-readable storage medium according to claim 11, wherein the generating a scene image according to the image of raw-shooting-material and the scene FOV comprises:
- acquiring a size of a panoramic image rendered by the display screen of the VR apparatus; and calculating a ratio of a degree of the scene FOV to 360 degrees, and determining the size of the scene image according to the ratio and the size of the panoramic image rendered by the display screen.

14. The non-transitory computer-readable storage medium according to claim 11, wherein, after displaying the scene image, the computer program instructions are executable by the at least one processor to further perform:
- detecting a rotation angle of the VR apparatus by using the gyroscope sensor; and
- calculating a ratio between the rotation angle and the scene FOV, and moving the display area on the scene image according to the size of the scene image and the ratio.

15. The non-transitory computer-readable storage medium of claim 11, wherein the computer program instructions are executable by the at least one processor to further perform:
- adjusting a distance between the lens and the display screen; and
- modifying the lens FOV according to the distance as adjusted.

* * * * *